3,064,311
FLAKING OF MENTHOL
Joseph P. Bain and Albert H. Best, Jacksonville, Fla., assignors to The Glidden Company, Cleveland, Ohio, a corporation of Ohio
Original application Jan. 26, 1960, Ser. No. 4,615, now Patent No. 3,023,253, dated Feb. 27, 1962. Divided and this application May 18, 1961, Ser. No. 111,068
1 Claim. (Cl. 18—47.5)

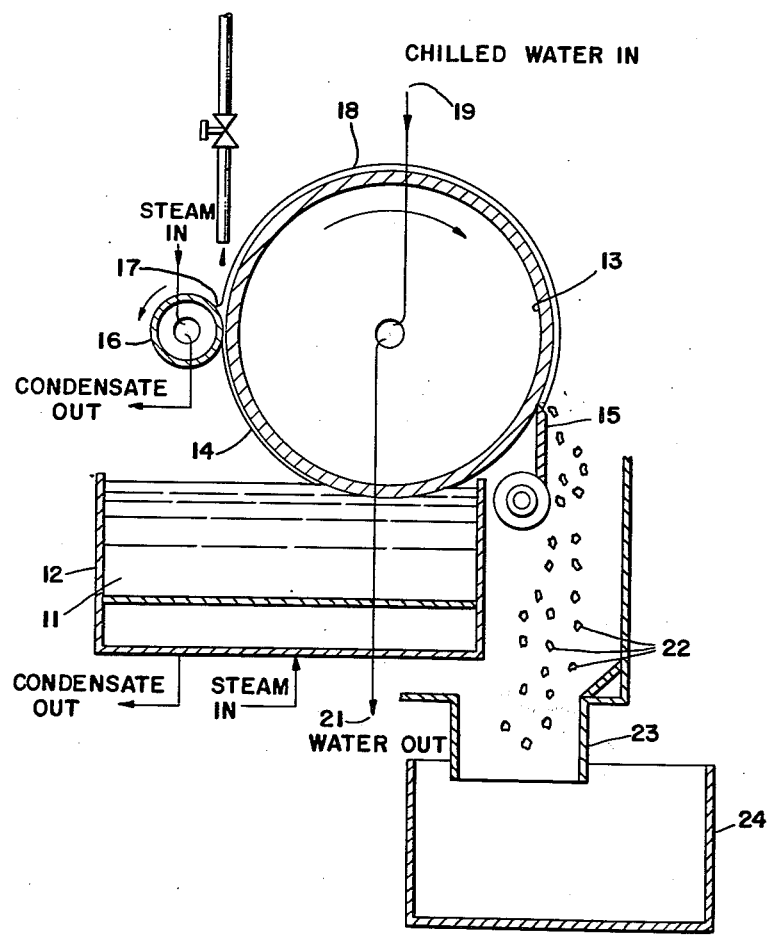

This invention relates to a process for flaking normally solid menthol, and to a flaked l-menthol product having ready pourability, rapid solubility in organic solvents, little dusting in handling, freedom from severe aggregation problems in storage, and freedom from other undesirable features and expense attendant to conventional crystalline menthol in massive or in pulverulent form.

By the term "normally solid menthol" we include both a pure isomer of menthol and a mixture of two or more menthol isomers which are in crystalline solid form at ordinary room temperature, i.e., 70° F. Of the isomers of menthol, l-menthol, dl-menthol and dl-neo-menthol are generally regarded as especially useful for their flavoring effects. The prime product of our process is l-menthol flake, useful for its cooling sensation in tobacco flavoring, confectionery and the like. Racemic menthol is also amenable to our processing as are the various l- and d-menthol, mixtures which are not truly racemic, but often called that for convenience.

Heretofore normally solid menthol, particularly l-menthol, has been made and sold in discrete crystalline form, as distinguished from a flake, and ordinarily the larger the individual crystal the more the product was desired. However, the practical problems of unloading containers of massive crystals and getting such crystals into the solution for use are laborious and often costly. Smaller crystals, while not needing pulverizing, tend to agglomerate and aggravate handling problems. The cost of the crystallizing operation itself in preparation of the menthol for sale is also a major factor to be considered. If the large crystals are pulverized for ease of solution, the additional cost of pulverizing is incurred, and dusting and frequency dense agglomeration of the particles are encountered with loss in ease of handling and loss also of valuable menthol.

Advantages of our processes over conventional processes include greater economy and simplicity, and our flake l-menthol product has the advantages set forth above.

Broadly our process for comminuting a normally solid menthol comprises forming a melt of said menthol by heating it, applying a film of the molten menthol to a chilling surface controlled at a temperature between about 0° F. and at least 10° F. below the initial congealing point of said melt, maintaining the dew point of the ambient atmosphere about the cooling surface below the temperature of said cooling surface, permitting said film to congeal at least to a plastic state, remove the congealed film from the cooling surface, and converting the removed film into particulate form.

The drawing is a diagram of the flaking operation and is described in detail in the example hereafter.

The removal of the film from the cooling surface and its conversion into particulate form can be done in two main ways. Preferably, for efficiency and economy in the operation, the menthol film is maintained in contact with the cooling surface sufficiently long to harden it to a brittle, frangible state, and the removal by scraping it from the cooling surface automatically breaks the film into desirable flakes.

Because of the polymorphism of normally solid menthols and particularly l-menthol when it is being crystallized rapidly, and because of the apparent transient crystal modifications that occur in the menthol cooling and crystallizing process, we have found it advantageous to temper the initially-deposited film of menthol in contact with the cooling surface by adding a little heat thereto, e.g., by use of a heated roller and/or the deposition of additional molten menthol to the originally-deposited film. The success of this technique appears to arise from its ability to reduce initial supercooling effects that ordinarily are encountered when the originally-deposited menthol film is picked up by or otherwise applied to the cooling surface. The technique also allows greater latitude in control of the cooling surface temperature relative to the molten menthol (which, of course, can be practiced to minimize or eliminate supercooling effects, although such control is admittedly delicate and can reduce the production rate of the flaking machine if tempering is not practiced).

Alternatively, the film of menthol on the cooling surface can be removed from the chilling surface by scraping or peeling when it is in a definitely plastic state, e.g., a flexible, waxy-feeling film resembling polyethylene in color and to the touch, and the removed flexible film comminuted as, for example, by slicing it into small regular polygons with a conventional slicing or cutting tool. The polygons can be rendered brittle by passing them through cold, dry air or by contacting them with a subsequent cooling drum, then removing them for collection and packaging. Such technique requires additional space and facilities and is, therefore, less preferred than the simultaneous practice of removing the brittle, solidified menthol film and flaking it.

The prime product of our process is a brittle l-menthol flake, 5 to 50 mils in thickness and about ⅛ to 1 inch in the largest dimension. These flakes exhibit a white coloration, and, when examined closely, are in reality an agglomerate or network of fine crystals which therefore expose an enormous surface area for solvent attack when put into use. They pour readily into and out of containers without substantial dusting and can be scooped up or otherwise handled extremely easily. Their reasonably uniform size appears to reduce agglomeration problems, and the normally encountered sublimation of the flakes in storage generally does not cause them to adhere tightly to each other. Usually a simple rap on the side of the container or the plunging of a scooping tool into a body of our flakes loosens them up and permits their ready and simple handling. Upon prolonged storage such flake develops from sublimation a fuzzy coating of adherent tiny, needle-like crystals which increase the surface area of the flake and render the flake more ready to dissolve; however the flake is still a discrete entity and can be handled advantageously as before.

The thickness of the flakes is readily controlled by our processing. Below about 5 mils thickness the production is comparatively slow; thinner flakes have no particular advantage in dissolution and frequently give greater handling problems because of frangibility and dusting. Flakes substantially thicker than about 50 mils are slower to dissolve and much more expensive to make because the transfer of latent heat of the melt to a cooling surface through films substantially above 50 mils in thickness is undesirably slow. This thickness is measured on the flake base, e.g., the freshly-made flake, and is exclusive of any minute projecting needle-like crystals which form in normal storage.

An important consideration in our process is to keep the menthol in a pure state. Accordingly, we prefer to use stainless steel equipment wherever possible for handling menthol during process. Very importantly, also, we find it necessary to maintain the dew point of the ambient atmosphere about the cooling surface below the temperature or cooling surface so that stray atmospheric water is not picked up and incorporated into the product during the process. Accordingly, in some locations, it is necessary to air condition, i.e., dry, the atmosphere surrounding the cooling surface. The apparatus desirably is hooded and can be totally enclosed for isolation from other plant facilities, if desired. The product flakes can be size graded by screening or other classification process if desired.

In our preferred operation the menthol in process is pharmaceutical grade (U.S.P.) l-menthol which has a melting point of 42–43° C. The congealing point for purposes of our process frequently coincides with the melting point of the menthol substances being flaked. It can be determined simply by melting the normally solid menthol in a tube, stirring the melt with a thermometer while cooling it, and reading the thermometer when crystals first form—the congealing point being this temperature.

While various coolants can be used for the indirect cooling of the menthol through the cooling surface, e.g., refrigerants such as halogenated hydrocarbons, ammonia, propane and the like, we find it satisfactory and more economical to use water cooling. Chilled water appears to be the cheapest and best coolant.

The temperature of the cooling surface, if maintained substantially below 0° F., makes for a costly operation and induces severe condensation and freezing problems from air. Freezing and condensation problems are also encountered up to 32° F. and thereby make these temperatures of operation less desirable. Temperatures up to about 55° F. frequently lead to condensation problems from atmosphere to some extent, and the temperatures below about 55° F. appear to induce greater supercooling in an l-menthol film being hardened on the cooling surface.

If the temperature of the cooling surface is substantially less than about 10° F. below the congealing point of the menthol melt, heat transfer is unduly slow and the process is rendered delicate. The advantageous temperature range for our operation is generally between about 55° and 70° F., and it is preferred to operate between 55° and 65° F. when flaking l-menthol to obtain a brittle, frangible, solid film at a rapid production rate, which film is removed in desirable flakes most economically.

Conventional equipment can be used for the cooling surface and for the congealed film removal equipment when our product is being flaked directly or is being converted into a plastic film and comminuted after removal from the cooling surface. We prefer to use a conventional single drum flaker wherein the film is removed with a doctor knife. Such equipment is illustrated for example in Figure 68 at page 1164 of the Chemical Engineers Handbook, Third Edition, edited by John H. Perry, McGraw-Hill Book Company, New York, N.W., 1950. A double drum flaker can also be used as illustrated in Figure 69 on the same page of that text. Alternatively, a conventional belt cooler such as a "Sandvik"-type cooler, or a deformable drum cooler such as a "Flakice"-type freezer can be used in our process.

The feed to a drum flaking machine is preferentially a pool of molten menthol maintained in a heated pan, and the depth of immersion of the drum into the pan can be regulated to pick up a film of desired thickness. As taught hereinabove, we prefer to temper the initially deposited film as the drum rotates away from immersion in the pan with a heated planetary roller pressing against the film, and to feed additional molten menthol into the pocket formed between the roller and the film on the drum to increase the cake thickness. More than one such roller can be used, e.g., two or three if desired; each additional roller adds about 5 mils thickness to the film on the drum if fed with molten menthol; we have found one roller to be quite effective for our process.

The effective temperature of the drum, for practical purposes, is the same as the outlet cooling water, and it is generally desirable to use a rapid flow of coolant so that there is only a degree F. or two between inlet and outlet coolant temperatures. If desired, a pair of rotating cooling drums can be used and the menthol fed into the pocket formed between them. In such instance the drums can be made to rotate in different directions relative to each other in conventional fashion.

The following example shows how our invention has been practiced, but should not be construed as limiting the invention. The operations described are for the flaking of l-menthol. Reference is made to the drawing.

A molten mass of l-menthol 11 was maintained in a steam jacketed melt pan, 12. The cooling surface used was a horizontal 1′ diameter by 18″ long cylindrical drum, 13, made of A.I.S.I. Type 304 austenitic stainless steel rotating at 5 r.p.m. above the melt tank and dipping slightly therein to pick up a film of menthol, 14, approximately 20 mils in thickness. The cooling drum was also equipped with a horizontal, blunt-edged doctor knife 15, substantially tangential to the cylinder wall above the melt pan. On the opposite side of the rotating cooling drum and planetary therewith was a horizontal feed roll 16, warmed internally by a steam line and positioned approximately 20 mils from the wall surface of the drum. Molten l-menthol, 17, was fed into the pocket between the feed roll and the film of menthol deposited on the rotating drum. By this means additional cake thickness, 18, was secured and the melt tank was fed by the overflow menthol from this location. The drum was scraped by the doctor knife; the freshly-exposed surface passed downwardly into the melt pan, upwardly to the feed roll, thence returned to the doctor knife in laden condition.

Chilled water was fed continuously into the rotating drum, 19, at a temperature of 60° F. and withdrawn continuously therefrom, 21, at a temperature less than ½° F. above the inlet temperature. Thereby, for practical considerations, the drum surface temperature was 60° F. The eventual menthol film, deposited by the dipping of the cooling surface into the melt pan and by the additional application from the feed roll, was approximately 30 mils thick. It gradually congealed in the time of travel of the drum from the feed roll to the doctor knife into a brittle, frangible, solid film. As the film contacted the doctor knife, it broke entirely into small white flakes, 22.

The preponderance of the flakes were flat, irregular polygons ranging from a ⅛ to ¾ of an inch in their longest dimension, most of them being substantially as wide as they were long. The output of flaked l-menthol was 130 pounds per hour. The flakes fell by gravity into a collecting chute, 23, and a collecting vessel, 24. They were discrete and did not tend to cohere to each other. Samples stored 24 hours and longer showed that the flakes maintained themselves in essentially their virgin condition, although normal sublimation of the l-menthol caused a slight adherency between flakes which could be overcome by giving the container a sharp rap and thereby restoring the original pourability of the flakes. The flakes exhibited a large, apparently porous surface per unit weight and were an aggregation of minute crystals suitable for dissolving rapidly in solvents such as methanol. After prolonged storage the flakes became "fuzzy," with a coating of minute needles. They resembled small chips of felt and exposed even more surface area for dissolving while still retaining good pourability and discrete, particulate nature. The menthol flakes from this process could also be compressed into pellets by conventional machinery.

By turning off the heat to the feed roll and rotating the drum more slowly the menthol film was removed by the doctor knife as a continuous integral sheet resembling thick, flexible polyethylene. Supercooling of the film deposited on the drum apparently was being induced and maintained during the contact of the film with the drum.

Such flexible sheet could be rendered brittle by being maintained at room temperature for a period of time at the expense of additional space and facilities and was, therefore, less desirable. Pieces of such plastic sheet material tended to fuse together to an undesirable degree when packaged. However, this sheet could be immediately sliced into small, regular polygons with conventional tools, and the polygons rapidly converted to brittleness by passing through cold, dry air prior to packaging.

This application is a division of our copending Patent application Ser. No. 4,615, filed on January 26, 1960, now Patent No. 3,023,253, and entitled "Flaking of Menthol."

We claim:

A process for comminuting substantially pure l-menthol which comprises forming a melt of said l-menthol, applying and congealing a thin layer of said molten l-menthol on a chilling surface controlled between a temperature of about 0° F. and at least 10° F. below the initial congealing point of said melt, maintaining the dew point of the ambient atmosphere about said chilling surface below the temperature of said chilling surface, applying additional l-menthol to the exposed area of said congealed thin layer, thereby forming a thickened layer which is readily frangible after continued contact with said chilling surface, continuing contact of the thickened layer with the chilling surface until said thickened layer hardens to a brittle, frangible, solid state, and scraping from said chilling surface, and thereby concomitantly flaking, said frangible thickened layer.

References Cited in the file of this patent
UNITED STATES PATENTS

| | | |
|---|---|---|
| 1,594,390 | Van Stone et al. | Aug. 3, 1926 |
| 2,555,309 | Beam | June 5, 1951 |
| 2,654,125 | Hall | Oct. 6, 1953 |
| 2,697,249 | Bettes et al. | Dec. 21, 1954 |